United States Patent [19]
Bergstrom

[11] 3,917,457
[45] Nov. 4, 1975

[54] PHOSPHORIC ACID REACTOR

[75] Inventor: Ralph C. Bergstrom, Chicago, Ill.

[73] Assignee: Whiting Corporation, Harvey, Ill.

[22] Filed: Apr. 1, 1971

[21] Appl. No.: 130,225

Related U.S. Application Data

[60] Division of Ser. No. 857,276, Aug. 25, 1969, abandoned, which is a continuation-in-part of Ser. No. 607,692, Jan. 6, 1967, abandoned.

[52] U.S. Cl.............. 23/259.2; 23/285; 23/273 R; 423/320; 423/167
[51] Int. Cl.² ...................... C01B 25/16; B01J 1/00
[58] Field of Search... 23/259.2, 285, 273 R, 165 R, 23/165 D; 159/45, 27 A

[56] References Cited
UNITED STATES PATENTS

| | | | |
|---|---|---|---|
| 1,945,281 | 1/1934 | Leithauser | 23/273 R |
| 2,827,366 | 3/1958 | Seaman | 23/273 R |
| 3,416,889 | 12/1968 | Caldwell | 23/259.2 |

*Primary Examiner*—James H. Tayman, Jr.
*Attorney, Agent, or Firm*—Lockwood, Dewey, Zickert & Alex

[57] ABSTRACT

An improved apparatus for manufacturing wet process phosphoric acid wherein the reactants which include phosphate rock and sulfuric acid are reacted in a combination reactor and cooler unit containing a body of reaction slurry having a substantially uniform level of calcium sulfate supersaturation throughout. The body of reaction slurry is circulated in a primary flow circuit in which substantially the entire body is exposed to a subatmospheric pressure maintained in the combination reactor and cooler unit at a first rate of flow at least equal to 20% of the total mass of reaction slurry per minute and preferably from 100 to 200% of the total mass of reaction slurry per minute. Simultaneously, a portion of the body of reaction slurry is circulated through a secondary flow circuit at a flow rate not greater than 50% of the first flow rate and preferably not greater than 10% of such first flow rate. While in such secondary flow circuit, the reaction slurry is heated to increase the temperature not more than 20°F., and preferably not more than 5°F., above the average bulk temperature of the body of reaction slurry. The residence time of the reaction slurry in the secondary flow circuit during and after heating does not exceed 30 seconds and preferably is not greater than 10 seconds. The heated reaction slurry is returned to the combination reactor and cooler unit at a location at which it will be substantially instantaneously cooled by contact with said circulating body of reaction slurry contained therein, resulting in an additional heat input into said body of reaction slurry without adversely affecting the substantially uniform level of calcium sulfate supersaturation therein.

5 Claims, 1 Drawing Figure

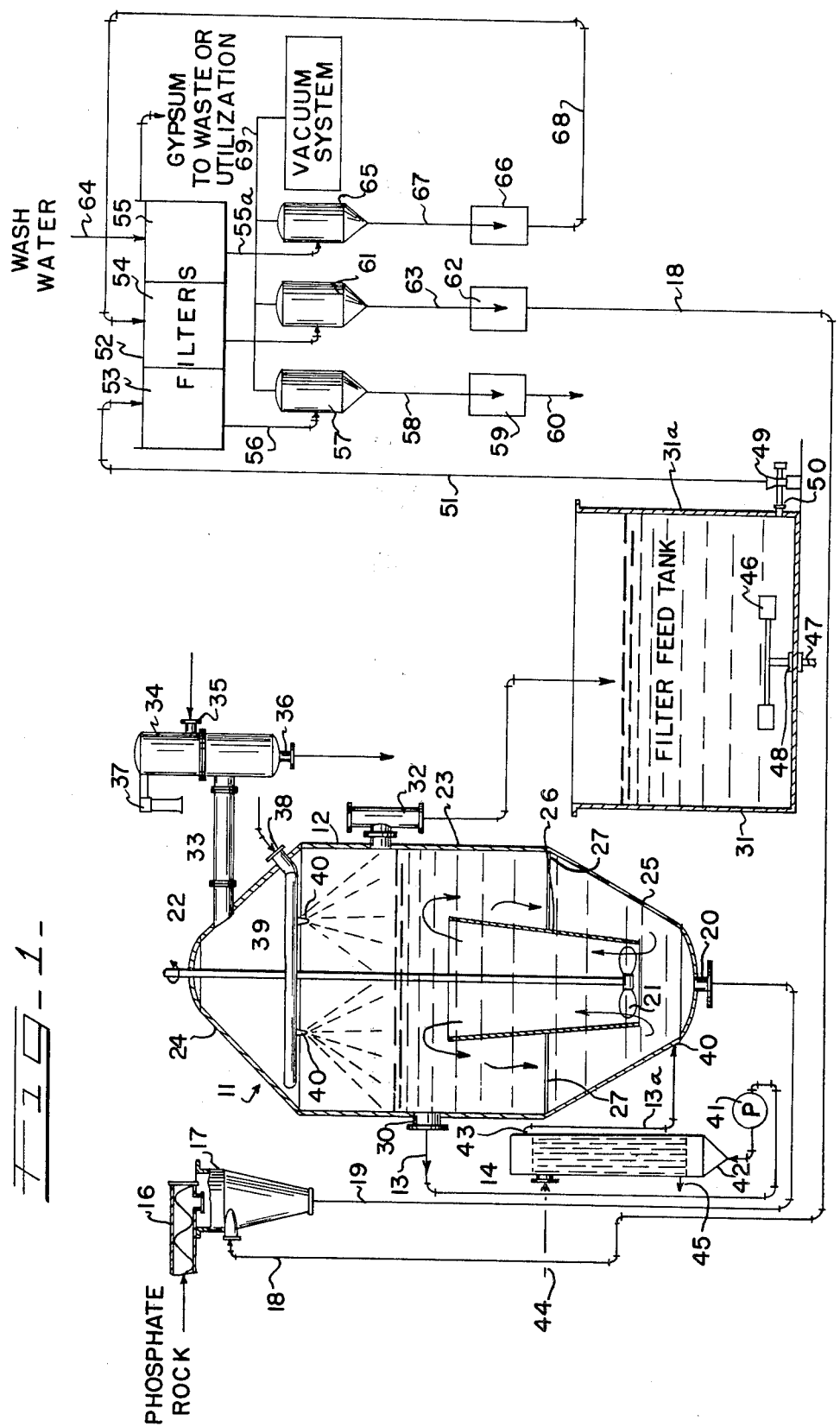

PHOSPHORIC ACID REACTOR

This application is a division of Ser. No. 857,276, filed Aug. 25, 1969, issued May 30, 1972 as U.S. Pat. No. 3,666,413 which application was a continuation-in-part of my then copending application Ser. No. 607,692, filed Jan. 6, 167, now abandoned and entitled "Improved Phosphoric Acid Reactor and Method."

The present invention relates to improvements and innovations in the manufacture of wet process phosphoric acid. More particularly, this invention is concerned with an improved apparatus for directly producing concentrated wet process phosphoric acid. In accordance with the practice in the wet process phosphoric acid industry, references to phosphoric acid strength in this application will be made by identifying the equivalent $P_2O_5$ concentration.

In the manufacture of phosphoric acid by conventional wet process methods, phosphate rock is reacted with sulfuric acid to produce a phosphoric acid product having an equivalent $P_2O_5$ concentration of about 30% by weight. This product is usually concentrated in an evaporator to provide a product having an equivalent $P_2O_5$ concentration of approximately 54% or to the "superphosphoric" level, viz., wherein the equivalent $P_2O_5$ concentration is approximately 68% or more.

The installation and operation expenses for a conventional phosphoric acid reactor and evaporator system are costly since such involve the installation and operation of two separate units, namely, a reactor and a forced circulation or equivalent evaporator. The present invention overcomes the disadvantages inherent in constructing and operating two separate units to produce a single product by providing a unique combination reactor and cooler unit which can be operated by a minimum of plant personnel to directly produce a concentrated wet process phosphoric acid product.

The practice of the present invention offers, as an important advantage, the ability to accommodate increased amounts of water in the slurry body from such sources as the use of a wet phosphate rock feed and the use of increded amounts of wash water which is recycled back to the wet process reaction slurry with the return weak phosphoric acid. With conventional wet process phosphoric acid manufacturing methods, only a limited amount of heat from the exothermic reactions in the slurry is available for vaporizing the water in the system to produce a wet process phosphoric acid product having a desired $P_2O_5$ concentration. Accordingly, with conventional methods it is necessary to limit the amount of water introduced into the system by using dry phosphate rock and limiting wash water to the filter so that calcium sulfate leaving the system contains 1% or more water soluble $P_2O_5$ looses. Increasing the allowable water rate in conventional systems would reduce this loss but would be accompanied by the disadvantage of resulting in a more dilute acid product.

In accordance with the present invention, an improved wet process phosphoric acid apparatus are provided wherein a main body of reaction slurry is continuously circulated in a predetermined primary flow circuit while a portion of the body of reaction slurry is withdrawn from the main slurry body, heated and then returned thereto. In particular, the main body of reaction slurry is circulated in a predetermined flow path adapted to expose substantially the entire body of reaction slurry to a subatmospheric pressure at a first rate of flow which is at least equal to 20%, and preferably from 100 to 200%, of the total mass of such body of reaction slurry per minute. This high circulation rate in combination with the controlled amount of evaporative cooling operates to provide a substantially uniform level of calcium sulfate supersaturation throughout the body of reaction slurry. Simultaneously, the body of reaction slurry circulated through the secondary flow circuit is circulated at a flow rate not greater than 50% of the first flow rate and preferably not greater than 10% of such first flow rate. While in such secondary flow circuit, the reaction slurry is heated to a temperature of not more than 20°F., and preferably not more than 5°F., above the average bulk temperature of the body of the reaction slurry. The residence time in the secondary flow circuit during and after heating is sufficiently short so that the calcium sulfate crystals present in the slurry circulated therethrough do not substantially dissolve and therefore the level of calcium sulfate supersaturation is not materially altered. Typically, such residence time at elevated temperatures is less than 30 seconds and preferably such residence time is not greater than 10 seconds. The heated reaction slurry from the secondary flow circuit is returned to the main body of reaction slurry at a location at which it will be substantially instantaneously cooled by contact with the primary flow circuit of the body of reaction slurry, thereby resulting in an additional heat input into the body of reaction slurry without adversely affecting the substantially uniform level of calcium sulfate supersaturation therein.

It is, therefore, an object of the present invention to provide an improved apparatus for the manufacture of wet process phosphoric acid.

Another object of the present invention is to provide an improved apparatus for directly producing a concentrated wet process phosphoric acid product.

Another object of the present invention is to provide an improved phosphoric acid reactor which can produce a phosphoric acid product having an equivalent $P_2O_5$ concentration limited only by the corrosive resistance of the materials of construction.

Another object of the present invention is to provide an improved apparatus for the manufacture of wet process phosphoric acid wherein controlled amounts of heat are externally introduced into the reactor for directly and efficiently producing a wet process phosphoric acid product having an equivalent $P_2O_5$ weight concentration of over 30%.

Another object of the present invention is to provide an improved apparatus for the manufacture of wet process phosphoric acid wherein wet phosphate rock feed can be accommodated with increased product yields and at an increased equivalent $P_2O_5$ product concentration.

Another object of the present invention is to provide an improved apparatus for the manufacture of wet process phosphoric acid in which increased amounts of wash water can be added for washing the calcium sulfate crystals on the filter produced by the reaction without reducing the equivalent $P_2O_5$ concentration of the product, thereby providing an increased product yield.

Another object of the present invention is the provision of a combination reactor and cooler unit for carrying out the manufacture of phosphoric acid by wet process techniques which unit occupies less space, requires fewer moving parts and is substantially less expensive to build, operate and maintain than conventional installations thereby substantially lowering installation and operating costs.

Other and further objects of the present invention will be apparent from the following detailed description taken in conjunction with the accompanying drawings wherein:

FIG. 1 is a partially schematic and partially diagrammatic view of apparatus for producing phosphoric acid by wet process techniques in a combination reactor and slurry cooler unit embodying the present invention;

Referring to the drawings, and with particular reference to FIG. 1, the numeral 11 generally designates a wet process phosphoric acid reactor system embodying principles of the present invention equipped with a combination reactor and cooler unit 12 having a secondary flow line 13 in which a portion of slurry is withdrawn from the reactor and cooler unit 12, heated in a heat exchanger 14 and then returned to the interior of the reactor and cooler unit 12.

In the illustrated embodiment, ground phosphate rock is fed from a rock feeding conveyor device 16 into a mixer 17 which receives metered amounts of return acid via return acid feed line 18. The return acid and the rock slurry are then dispensed through reactor feed line 19 into the combination reactor and cooler unit 12 at feed inlet 20 adjacent the bottom thereof. This location in the reactor and cooler unit 12 is characterized by high turbulence principally developed by a forced circulation means in the form of a propeller 21 which, in the illustrated embodiment, is mounted to the lower end of a drive shaft 22 operatively connected to a suitable motor (not illustrated).

As shown in FIG. 1, the reactor and cooler unit 12, which constitutes a preferred embodiment of the present invention, includes a fixed diameter midsection 23 closed at its upper and lower ends by frusto-conical top and bottom sections 24 and 25. A flow directing means in the form of a draft tube 26 is coaxially supported in the interior of the unit 12 by means of a plurality of radial vane members 27 which respectively function to minimize rotation of the body of reaction slurry contained therein. The upper end of the draft tube 26 preferably terminates slightly below the normal operating liquid level within the unit 12. Propeller 21 is positioned and rotated so that liquid in the reactor and cooler unit 12 will be drawn in from the bottom, upwardly through the draft tube 26 and downwardly along the outside thereof in a primary flow pattern which, in the illustrated embodiment, is a torroidal flow pattern as is schematically indicated in FIG. 1 by the arrows.

A uniform level of supersaturation throughout the body of reaction slurry in the combination reactor and cooler unit 12 is maintained by circulating the slurry body in the primary flow pattern wherein substantially the entire body of reaction slurry is exposed to a subatmospheric pressure maintained in the unit 12 at a flow rate which is at least equal to 20% of the total mass of reaction slurry per minute and which is preferably from 100 to 200% of the total mass of reaction slurry per minute.

Slurry level in the reactor-cooler unit 12 is maintained by an overflow device 32 which discharges the overflow liquid by gravity into a filter feed tank 31. Vapors emitted from the reaction slurry are transmitted through vapor overhead connection line 33 to a condenser 34 having a cold water inlet 35, condensate discharge outlet 36, and steam inlet 37.

The temperature of the body of reaction slurry is effectively controlled by the subatmospheric pressure maintained in the freeboard space above the slurry body. In this regard, it should be noted that the improved method and apparatus of the present invention can be used to manufacture wet process acid at temperatures of from 160°F. to 230°F. and above. Accordingly, this invention finds advantageous applicability to the wet process phosphoric acid systems wherein gypsum ($CaSO_4 \cdot 2H_2O$) and/or the hemihydrate form of calcium sulfate ($CaSO_4 \cdot \frac{1}{2} H_2O$) are formed.

In the illustrated embodiment, sulfuric acid is delivered into the combination reactor and cooler unit 12 through acid inlet 38 which projects into the interior of frusto-conical top 24 and carried an annular spray head 39 equipped with a plurality of discharge openings 40 in the bottom thereof enabling sulfuric acid to be efficiently sprayed and distributed throughout the interior of the freeboard space in the reactor and cooler unit 12.

In accordance with the invention, a portion of the slurry in combination reactor and cooler unit 12 is circulated through a secondary flow circuit in the form of the sidearm loop 13 which includes heat exchanger 14. After being heated, the slurry is returned to the combination reactor and cooler unit 12, preferably being introduced in the lower end of frusto-conical bottom member 25, as generally designated by the reference numeral 40, wherein it is uniformly admixed with the incoming phosphate rock and acid slurry entering through inlet 20 in the primary flow circuit.

In the illustrated embodiment, outlet 30 communicates with loop 13 which includes an axial flow or equivalent pump 41 having its discharge end communicating directly with the tube inlet header 42 of heat exchanger 14. Upon being heated, the slurry exits through tube header outlet 43 and returns to the combination reactor and cooler unit 12 via the secondary circuit return line portion 13a. Steam or other suitable heating medium is introduced into heat exchanger 14 in a conventional manner as is generally shown at 44 and exits at condensate outlet 45.

The portion of the body of reaction slurry circulated through the secondary flow circuit is heated to a temperature of not more than 20°F., and preferably not more than 5°F., above the average bulk temperature of the body of reaction slurry in the combination reactor and cooler unit 12. This relatively low temperature increase is employed in conjunction with a residence time of the reaction slurry in the secondary flow circuit which does not exceed 30 seconds and is preferably not greater than 10 seconds in order to insure that there is no appreciable change in the supersaturation level of the reaction slurry circulated therethrough. In other words, the heated portion of the reaction slurry is returned to the main body of reaction slurry and cooled therein before the calcium sulfate precipitate contained therein appreciably dissolves. The flow rate through the secondary flow circuit should not exceed 50% of the flow rate of the entire body of reaction slurry in the primary flow circuit. Preferably, the flow rate through the secondary flow circuit will be equal to, or less than, 10% of such primary flow rate.

Filter feed tank 31 is provided with an agitator 46 which serves to keep the contents of the filter feed tank 31 uniformly dispersed. In the illustrated embodiment, agitator 46 is mounted to the upper end of a shaft 47 which passes through a seal 48 and is driven in known manner.

Reaction slurry is removed at a uniform rate from filter feed tank 31 by a pump 49 connected to discharge outlet 50 located in the bottom of sidewall 31a of filter feed tank 31. Pump 49 discharges the reaction slurry through discharge pipe 51 into the first stage of a series of filters 52 which, in the illustrated embodiment, consists of three filter units 53–55. In the first filter unit 53, concentrated phosphoric acid is separated from the crystals and is drawn off through the bottom through filtrate pipe 56 into vacuum tank 57. This concentrated phosphoric acid is discharged through line 58 into storage tank 59 and is selectively removed therefrom via product discharge outlet 60. The reaction slurry, from which a substantial portion of the concentrated phosphoric acid has been removed, passes from the filter unit 53 into the second filter unit 54 which also receives wash water from filter unit 55 through wash water return line 68 as is more fully described below. Weak phosphoric acid is drawn off from the filter unit 54 into vacuum tank 61 and is discharged therefrom into receiving tank 62 via communicating line 63. Weak phosphoric acid is then discharged from receiving tank 62 into return acid feed line 18 for mixing with phosphate rock feed, which, due to the increased evaporative capacity of the combination reactor and cooler unit, can be in the form of so-called wet phosphate rock without necessitating a reduction in the $P_2O_5$ level of the phosphoric acid product and without reducing the product yield.

The slurry which passes through filter unit 54 into the third and last filter unit 55 is washed with wash water from a suitable source 64. The washed calcium sulfate crystals are discharged from filter unit 55 either to waste or any further utilization which may be desired. Wash water is drawn into vacuum receiver 65 through intercommunicating line 55a and is discharged therefrom into receiving tank 66 via line 67. This wash water is returned to filter unit 54 by return line 68. All of the vacuum receivers 57, 61 and 65 are connected to a common vacuum header 69.

An important feature of the present invention concerns the fact that substantially greater quantities of water may be used for washing the filter cake in filter units 53–55 without adversely affecting the concentration of the phosphoric acid product concentration since the excess water is removed with other vapors in combination reactor and cooler unit 12. This advantageous use of increased amounts of wash water substantially reduces phosphoric acid loss at this source and produces greater product yields at higher concentrations than are obtained with conventional wet process reactor systems.

The following detailed working example describing reactor system 11 of FIG. 1 will serve to illustrate the nature of the invention and the manner in which the evaporator system thereof can be operated.

EXAMPLE I

The combination reactor and cooler unit 12 may have a height of 25 feet with cylindrical section 23 having a diameter of 18 feet. The draft tube 26 would have a diameter of 4 feet and would project down to within about 2 feet of the bottom of reactor-cooler unit 12. The normal liquid operating level within tank 12 should be about 10 feet. The condenser 34 would be capable of producing 22–24 inches of vacuum within the head space of the combination reactor and cooler unit 12.

The heat exchanger 14 may have an over all height of 20 feet and contain 55 heat exchanger tubes formed of impervious graphite, each having an inside diameter of 1 ½ inches and a length of 18 feet. The pump 41 would be rated at 2,150 gallons per minute (gpm) and be driven by a motor having 20 horsepower. Filter feed tank 31 can have a diameter of 18 feet and a sidewall height of 20 feet for handling a normal liquid operating level of 15 feet.

The operating conditions may be summarized as follows for an installation having a capacity of 100 tpd $P_2O_5$ at a concentration of 40% $P_2O_5$.

Typical central Florida phosphate rock is introduced through the conveyor 16 into the mixer 17 at a rate of 330 tpd while 679 tpd of return phosphoric acid are admixed therewith. The resulting slurry is fed through reactor feed line 19 into the bottom of reactor-cooler 12.

Sulfuric acid having a concentration of 93% is fed at the rate of 276 tpd into the acid inlet 38 for discharge into the slurry contained in reactor-cooler 12 while propeller 21 is driven at approximately 100 rpm by a 25 horsepower motor. The flow through the primary flow circuit would be approximately 21,500 gpm and the flow through the secondary flow circuit would be approximately 2,150 gpm with approximately 4,700,000 BTU of heat being added to the slurry flow per hour. The heat from the reaction would be approximately 55 million BTU's per hour. The total heat removed by the reactor-cooler unit would be 59,700,000 BTU's per hour. The reaction slurry to be processed in the filer feed tank is withdrawn through the overflow device 32 into filter feed tank 31 at a 40% $P_2O_5$ concentration and flow rate of approximately 1,166 tpd. Reaction slurry containing crystals dispersed in concentrated phosphoric acid are withdrawn from filter feed tank 31 through outlet 50 at an equal rate of 1,166 tpd and discharged to filter series 52. Wash water at a rate of 457 tpd is introduced through line 64. 250 tpd of phosphoric acid having a concentration of 40% $P_2O_5$ are produced along with 465 tpd of calcium sulfate crystals.

In the foregoing specification, a detailed description of two specific embodiments of the present invention have been fully set forth. It will, however, be apparent to those skilled in the art that variations and modifications may be made therefrom without departing from the spirit and scope of the present invention. Accordingly, this invention is to be limited only by the scope of the following claims.

I claim:

1. A combination reactor and cooler unit for manufacture of wet process phosphoric acid comprising: a vessel which is at least partially enclosed and adapted to operate with an enclosed freeboard space above a body of reaction slurry contained therein; means for maintaining a predetermined slurry level in said vessel; a vacuum source communicating with said freeboard space for maintaining a subatmospheric pressure in said freeboard space; flow directing means and first forced circulation means operatively associated therewith mounted in said vessel for circulating said body of reaction slurry in a primary flow pattern adapted to expose substantially the entire body of reaction slurry to said subatmospheric pressure in said freeboard space at a first rate sufficient to provide complete recirculation of substantially said entire body of reaction slurry at least once every five minutes; a secondary flow circuit operatively connected to said vessel, said secondary flow circuit having an inlet and outlet which communicate with said vessel below said means for maintaining said predetermined slurry level; heater means mounted in said secondary flow circuit for heating slurry circulated therethrough; and, second forced circulation means operatively associated with said secondary flow circuit for circulating a portion of said reaction slurry through said secondary circuit at a rate which will provide a residence time during and after heating of said portion of reaction slurry circulated through said secondary flow circuit of not longer than 30 seconds, the flow rate of said secondary circuit not exceeding 50% of the primary flow rate in said vessel.

2. The apparatus of claim 1 wherein said flow directing means comprises a draft tube.

3. The apparatus of claim 1 wherein the outlet of said secondary flow circuit communicates with said vessel at a location wherein the heated reaction slurry from said secondary flow circuit is substantially uniformly and immediately dispersed in said body of reaction slurry.

4. The combination reactor and cooler unit of claim 1 wherein the outlet of said secondary flow circuit communicated with said vessel adjacent said first forced circulation means.

5. Apparatus for making wet process phosphoric acid from reactants which include phosphate rock, sulfuric acid and water, said apparatus comprising: a reactor vessel; means for continuously adding said reactants to a body of reaction slurry contained in said reactor vessel, said reactants upon being combined in said body of reaction slurry generating heat from exothermic reactions which occur therein; means for continuously maintaining a subatmospheric pressure above a portion of said body of reaction slurry to induce evaporative cooling thereof; means for maintaining a predetermined slurry level in said vessel; means for continuously circulating substantially the entire body of reaction slurry in a primary flow circuit adapted to expose substantially the entire body of reaction slurry to said subatmospheric pressure at a first rate of flow; means for continuously circulating a portion of said body of reaction slurry through a secondary flow circuit at a rate which does not exceed 50% of said first rate of flow, said secondary flow circuit having an inlet and outlet which are each below said means for maintaining said predetermined slurry level in said vessel; means for heating said portion of reaction slurry in said secondary flow circuit to an elevated temperature of said body of reaction slurry, said secondary flow circuit circulating means and heater means cooperating to maintain said portion of reaction slurry at said elevated temperature for not longer than 30 seconds; said means for inducing evaporative cooling of said body of reaction slurry being adapted to maintain the rate of cooling in substantial balance with the rate at which heat is generated from said exothermic reactions and from the heating of the reaction slurry in said secondary flow circuit; and, means for continuously withdrawing a portion of said reaction slurry from said combination reactor and cooler.

* * * * *

UNITED STATES PATENT AND TRADEMARK OFFICE
CERTIFICATE OF CORRECTION

PATENT NO. : 3,917,457
DATED : November 4, 1975
INVENTOR(S) : Ralph E. Bergstrom It is certified that error appears in the above-identified patent and that said Letters Patent are hereby corrected as shown below:

The name of the inventor should read --Ralph E. Bergstrom--

Column 1, line 8, "Jan. 6, 167" should read --Jan. 6, 1967--

Column 1, line 43, "increaded" should read --increased--

Column 4, line 21, "the invention" should read --the present invention--

Column 7, line 24, "communicated" should read --communicates--

Column 8, line 18, after "of" insert --not more than 20°F. above the average bulk temperature of--

Signed and Sealed this

Eleventh Day of October 1977

[SEAL]

Attest:

RUTH C. MASON
Attesting Officer

LUTRELLE F. PARKER
Acting Commissioner of Patents and Trademarks